(12) United States Patent
Pan et al.

(10) Patent No.: US 7,539,262 B2
(45) Date of Patent: May 26, 2009

(54) METHOD AND APPARATUS FOR PERFORMING CHIP LEVEL EQUALIZATION USING JOINT PROCESSING

(75) Inventors: Jung-Lin Pan, Selden, NY (US); Robert A. DiFazio, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 752 days.

(21) Appl. No.: 11/259,430

(22) Filed: Oct. 26, 2005

(65) Prior Publication Data

US 2006/0126568 A1  Jun. 15, 2006

Related U.S. Application Data

(60) Provisional application No. 60/636,345, filed on Dec. 14, 2004, provisional application No. 60/642,383, filed on Jan. 7, 2005.

(51) Int. Cl.
*H04B 7/02* (2006.01)
(52) U.S. Cl. .................................... 375/267
(58) Field of Classification Search ............... 375/143, 375/144, 232–236, 260, 267, 340, 350
See application file for complete search history.

(56) References Cited

U.S. PATENT DOCUMENTS

2002/0191568 A1  12/2002  Ghosh
2003/0026325 A1  2/2003  De et al.
2003/0095529 A1  5/2003  Petre et al.
2003/0125090 A1*  7/2003  Zeira ........................... 455/562
2004/0120274 A1  6/2004  Petre et al.
2004/0127164 A1  7/2004  Mondragon-Torres et al.
2004/0223480 A1  11/2004  Nguyen et al.
2004/0228392 A1  11/2004  Zhang et al.
2006/0280266 A1*  12/2006  Li ............................... 375/340
2008/0031374 A1*  2/2008  Walton et al. ............... 375/267

* cited by examiner

*Primary Examiner*—Don N Vo
(74) *Attorney, Agent, or Firm*—Volpe and Koenig, P.C.

(57) ABSTRACT

A method and apparatus for performing chip level equalization (CLE) using joint processing to enhance performance and system throughput using a transmitter having a plurality of transmit antennas and a receiver having a plurality of receive antennas. A channel response matrix is formed between the transmit antennas and the receive antennas to generate a joint channel correlation matrix between the transmit antennas and the receive antennas using a block-FFT (B-FFT) decomposition of the channel response matrix. Estimates of transmitted chip sequences from each of the transmit antennas are generated using minimum mean square error (MMSE) and the joint channel correlation matrix are combined. The combined estimate of the transmitted chip sequences are despread to recover transmitted data.

32 Claims, 6 Drawing Sheets

| FIG. 2A |
| FIG. 2B |

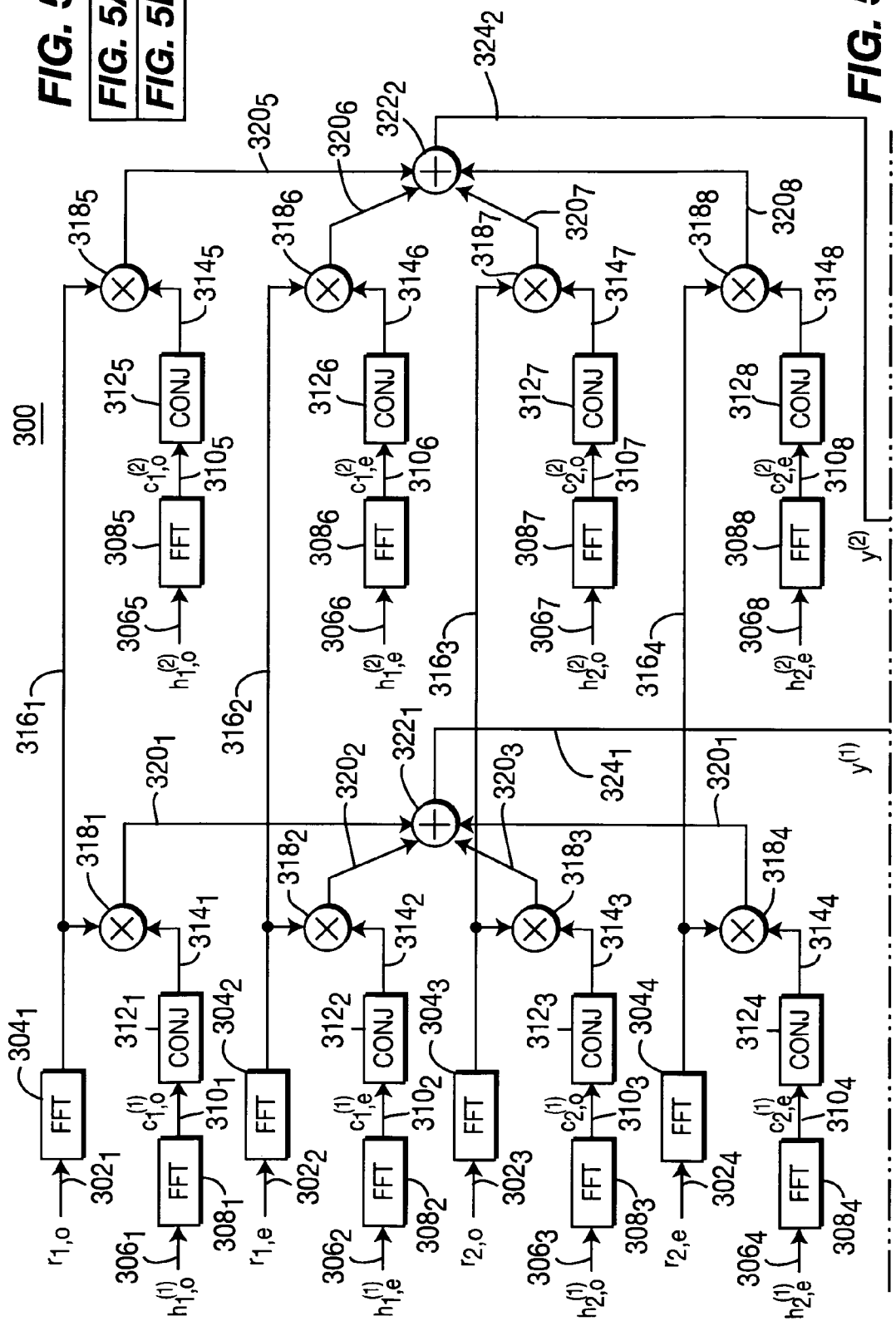

METHOD AND APPARATUS FOR PERFORMING CHIP LEVEL EQUALIZATION USING JOINT PROCESSING

CROSS REFERENCE TO RELATED APPLICATIONS

This application claims the benefit of U.S. Provisional Patent Application Nos. 60/636,345 filed Dec. 14, 2004 and 60/642,383 filed Jan. 7, 2005, which are incorporated by reference as if fully set forth.

FIELD OF INVENTION

The present invention is related to a wireless communication receiver. More particularly, the present invention relates to a receiver that processes space-time transmit diversity (STTD), closed loop transmit diversity for transmit adaptive antennas and receiver diversity with over-sampling and fast Fourier transform (FFT)-based chip level equalization (CLE) using joint processing.

BACKGROUND

CLE is a candidate for use in advanced receivers in wireless communication systems for high data rate services such as high speed downlink packet access (HSDPA). CLE-based receivers, such as those used in wireless transmit/receive units (WTRUs), are used more often than Rake receivers in advanced receivers due to their superior performance.

Receive diversity using two or more receive antennas provides high performance by improving the reception quality of signals. Over-sampling is also used to improve the reception performance by rectifying performance degradations caused by timing errors or sampling errors. In addition, transmit adaptive antennas are used to improve signal degradations caused by fading, and thus improve data detection performance at the receiver and enhance the system throughput.

In conventional receivers which implement equalization, each channel that corresponds to an antenna is equalized independently of other channels that correspond to other antennas. However, these type of receivers usually experience significant performance degradations due to mutual channel interference from one antenna to another that cannot be eliminated or cancelled. Therefore, there is a need for receivers which implement CLE such that mutual channel interference is reduced or eliminated.

SUMMARY

The present invention is related to a method and apparatus for performing CLE using joint processing to enhance performance and system throughput using a transmitter having a plurality of transmit antennas and a receiver having a plurality of receive antennas. A channel response matrix is formed between the transmit antennas and the receive antennas to generate a joint channel correlation matrix between the transmit and the receive antennas using a block-FFT (B-FFT) decomposition of the channel response matrix. Estimates of transmitted chip sequences from each of the transmit antennas are generated using minimum mean square error (MMSE) and the joint channel correlation matrix are combined. The combined estimate of the transmitted chip sequences is despread to recover transmitted data.

BRIEF DESCRIPTION OF THE DRAWINGS

A more detailed understanding of the invention may be had from the following description of a preferred embodiment, given by way of example and to be understood in conjunction with the accompanying drawings wherein:

FIGS. 5A and 5B, taken together, are an exemplary block diagram of a receiver implementing B-FFT-based CLE using joint processing in STTD and receive diversity with over sampling in accordance with the present invention.

DETAILED DESCRIPTION OF THE PREFERRED EMBODIMENTS

Figure 1:
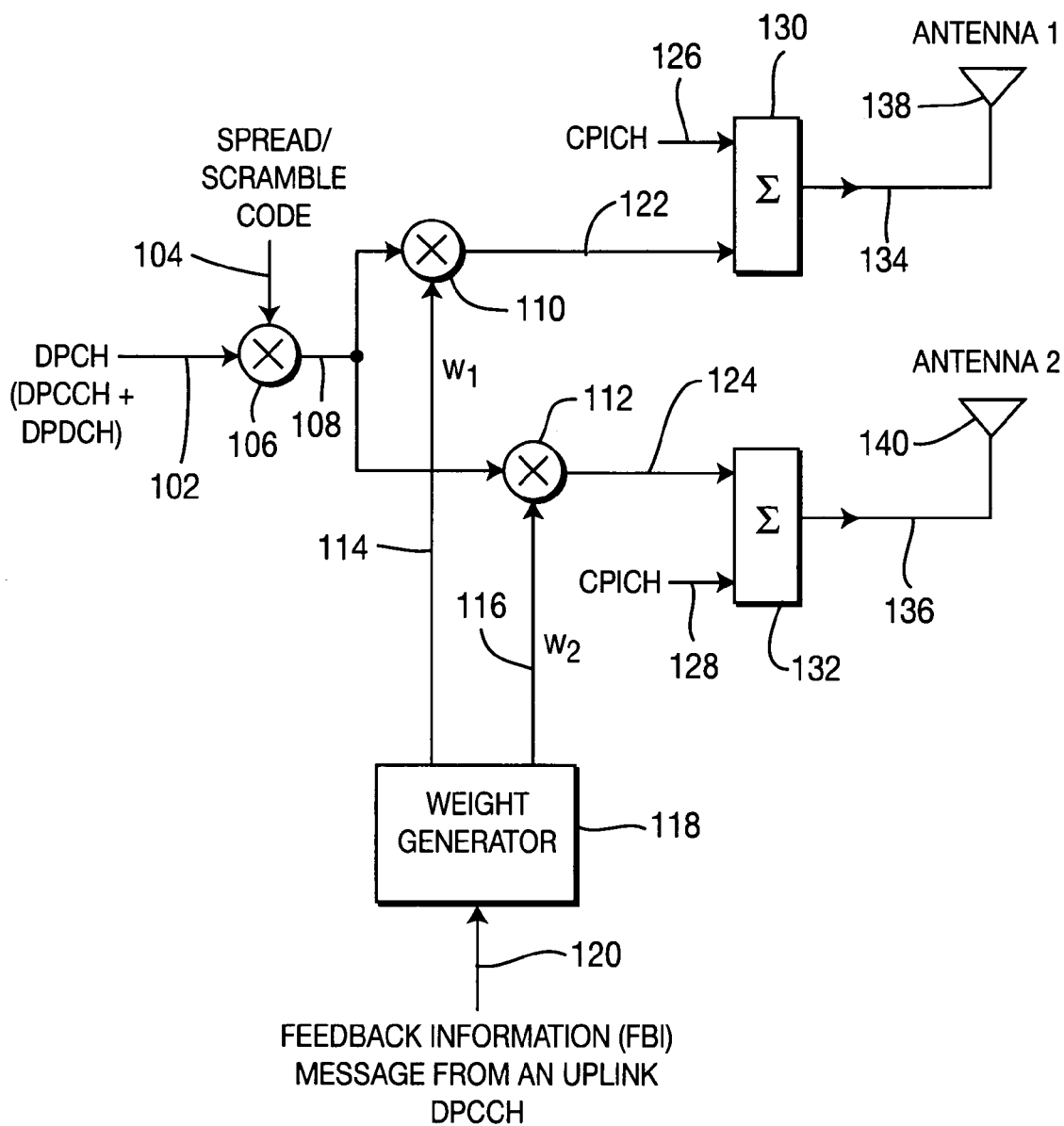
FIG. 1 is a block diagram of a transmitter for supporting closed loop mode transmit diversity for dedicated physical channel (DPCH) transmission in accordance with the present invention.

The present invention will be described with reference to the drawing figures wherein like numerals represent like elements throughout.

Hereafter, the terminology "WTRU" includes but is not limited to a user equipment (UE), a mobile station, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

The present invention provides a method and apparatus for implementing an advanced wireless receiver using CLE and joint processing. The joint processing eliminates or reduces mutual channel interference and enhances data detection performance and system throughput. The joint processing-based CLE in accordance with the present invention utilizes transmit diversity and receive diversity with over-sampling. The over-sampling is preferably at twice the chip rate, but the sampling rate may be at any rate. Compared with the receiver using individual equalizers, where each equalizer is dedicated for one antenna, the joint processing-based CLE considers the mutual interference between antennas and eliminates the mutual interferences using joint approaches. Furthermore, the joint processing-based CLE in accordance with the present invention uses B-FFT techniques to realize efficient implementation. The B-FFT and joint processing-based CLE in the present invention has the same number of FFT operations as compared to a prior art receiver without joint processing.

FIG. 1 is a block diagram of a transmitter 100 for supporting closed loop mode transmit diversity for dedicated physical channel (DPCH) transmission in accordance with the present invention. In a closed loop mode transmit diversity, a WTRU sends a feedback signaling message (FSM) to the UMTS terrestrial radio access network (UTRAN) to maximize the received power of the WTRU. Two different closed loop modes, (closed loop modes 1 and 2) are defined. The use of the two closed loop modes is controlled via higher layer signaling.

As shown in FIG. 1, a DPCH data sequence 102, (including a dedicated physical control channel (DPCCH) data sequence and a dedicated physical data channel (DPDCH) data sequence is despread and descrambled by multiplying the DPCH data sequence 102 with a spreading code and scrambling code 104 via a multiplier 106 to generate a spread complex valued signal 108. The spread complex valued signal 108 is fed into multipliers 110, 112, each of which multiplies the spread complex valued signal 108 by a first antenna specific weight factor 114, $w_1$, and a second antenna specific weight factor 116, $w_2$, respectively. The weight factors 114, 116 are complex valued signals, (i.e., $w_i = a_i + jb_i$), which are generated by a weight generator 118 based on a feedback information (FBI) message 120 from an uplink DPCCH.

As shown in FIG. 1, the resulting signals 122, 124 output from the multipliers 110, 112 are respectively summed with respective common pilot channels (CPICHs) 126, 128 via a respective summer 130, 132 to generate transmission signals 134, 136 which are transmitted by respective antennas 138, 140.

The weight factors 114, 116 correspond to phase adjustments in a closed loop mode 1 and phase/amplitude adjustments in a closed loop mode 2. For the closed loop mode 1, different, (preferably orthogonal), dedicated pilot symbols in the DPCCH are transmitted by the antennas 138, 140. For the closed loop mode 2, the same dedicated pilot symbols in the DPCCH are transmitted by the antennas 138, 140.

Figures 2, 2A:
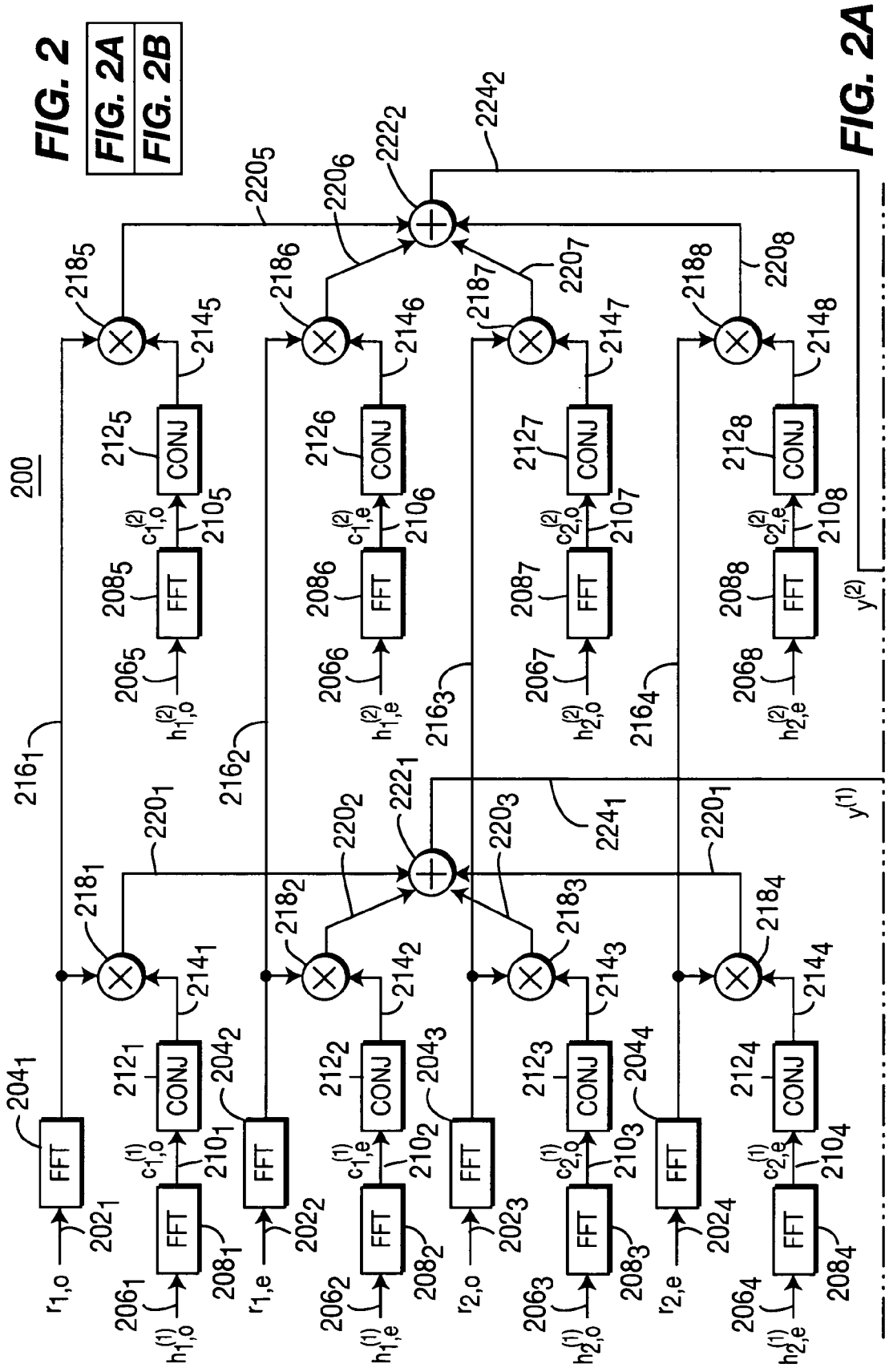
FIGS. 2A and 2B, taken together, are an exemplary block diagram of a receiver implementing B-FFT-based CLE using joint processing with transmit and receive diversity at twice the chip rate in accordance with the present invention.
Figure 2B:
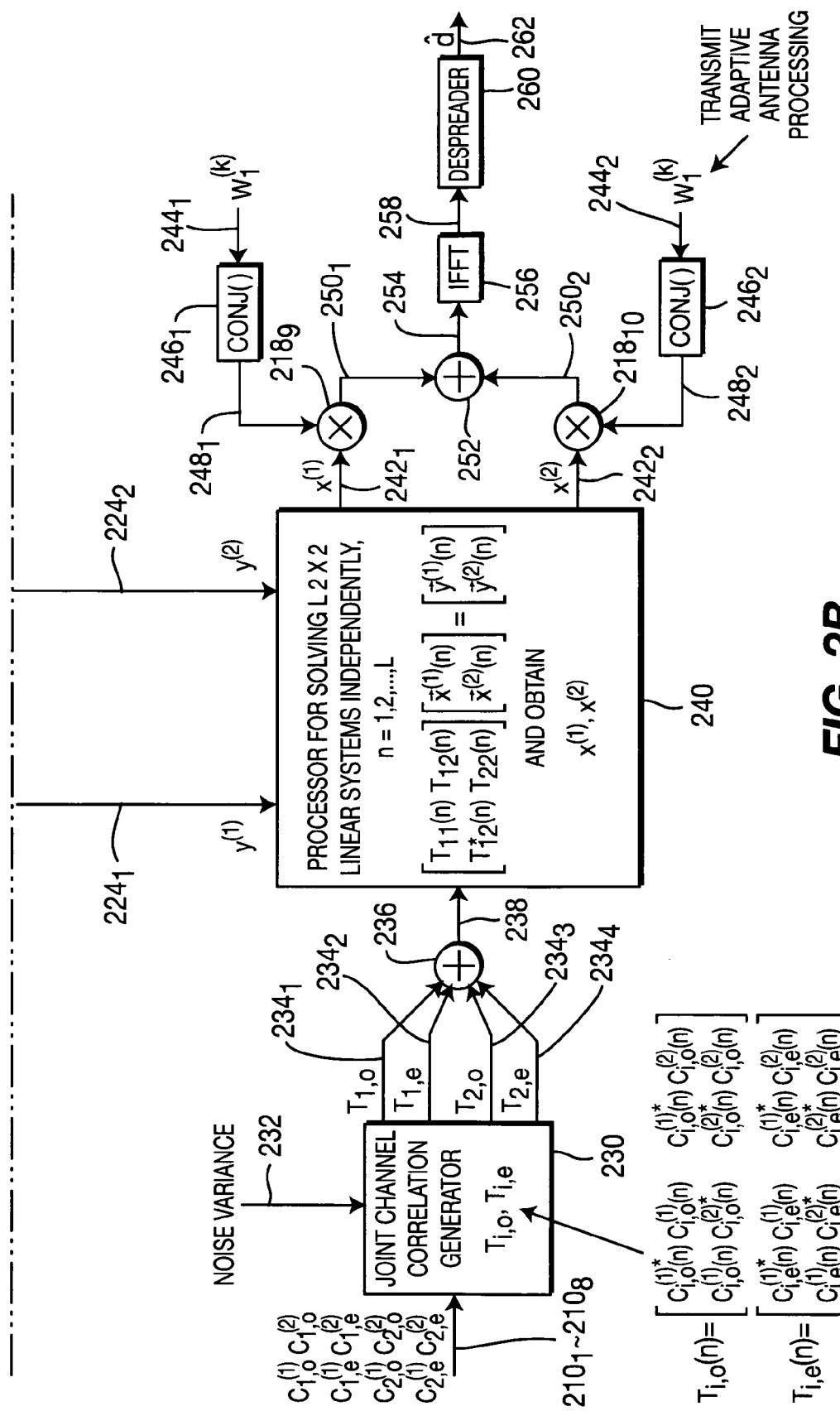

The transmitter 100 uses the CPICH signals 126, 128 transmitted from the antenna 138 and the antenna 140 to calculate the phase adjustment to be applied at the UTRAN to maximize the received power of a WTRU including the receiver 200 of FIGS. 2A and 2B. In each time slot, the receiver 200 calculates the optimum phase adjustment, $\phi$, for antenna 140, which is then quantized into $\phi_Q$ having two possible values as follows:

$$\phi_Q = \begin{cases} \pi, & \text{if } \pi/2 < \phi - \phi_r(i) \leq 3\pi/2 \\ 0, & \text{otherwise} \end{cases} \quad \text{Equation (1)}$$

where $$\phi_r(i) = \begin{cases} 0, & i = 0, 2, 4, 6, 8, 10, 12, 14 \\ \pi/2, & i = 1, 3, 5, 7, 9, 11, 13 \end{cases} \quad \text{Equation (2)}$$

If $\phi_Q = 0$, a command '0' is sent to the UTRAN using the $FSM_{ph}$ field and if $\phi_Q = \pi$, a command '1' is sent to the UTRAN using the $FSM_{ph}$ field.

Due to rotation of the constellation at the WTRU in the closed loop mode 1, the UTRAN interprets the received commands according to table 1 which shows the mapping between phase adjustment, $\phi_i$, and the received feedback command for each uplink slot.

TABLE 1

| | Slot # | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| FSM 0 | 0 | π/2 | 0 | π/2 | 0 | π/2 | 0 | π/2 | 0 | π/2 | 0 | π/2 | 0 | π/2 | 0 |
| 1 | π | −π/2 | π | −π/2 | π | −π/2 | π | −π/2 | π | −π/2 | π | −π/2 | π | −π/2 | π |

The weight 116, $w_2$, is then calculated by averaging the received phases over 2 consecutive slots as follows:

$$w_2 = \frac{\sum_{i=n-1}^{n} \cos(\phi_i)}{2} + j \frac{\sum_{i=n-1}^{n} \sin(\phi_i)}{2}; \quad \text{Equation (3)}$$

where $\phi_i \in \{0, \pi, \pi/2, -\pi/2\}$. For antenna 1, $w_1$ is constant $w_1 = 1/\sqrt{2}$.

The phase and amplitude are both adjusted in the closed loop mode 2. The adjustments are based on the commands received in the FSM and are summarized in Tables 2 and 3 for the power and phase adjustments respectively.

TABLE 2

| $FSM_{po}$ | Power_ant1 | Power_ant2 |
|---|---|---|
| 0 | 0.2 | 0.8 |
| 1 | 0.8 | 0.2 |

TABLE 3

| $FSM_{ph}$ | Phase difference between antennas (radians) |
|---|---|
| 000 | π |
| 001 | −3π/4 |
| 011 | −π/2 |
| 010 | −π/4 |
| 110 | 0 |
| 111 | π/4 |
| 101 | π/2 |
| 100 | 3π/4 |

Antenna 138 transmits data symbols using weight coefficient $w_1^{(k)}$ 112 and antenna 140 transmits data symbols using weight coefficient $w_2^{(k)}$ 116 for the $k^{th}$ channelization code.

The received signal can be expressed as follows:

$$r = H_1 \left( \sum_{k=1}^{K} w_1^{(k)} s_k \right) + H_2 \left( \sum_{k=1}^{K} w_2^{(k)} s_k \right) + n; \quad \text{Equation (4)}$$

where $H_1$ and $H_2$ is the channel response matrix corresponding to the first and second (diversity) transmit antennas, respectively. The transmitted chip sequences are related by the spreading code matrix C as $s_k = C_k \vec{d}_k$ for the $k^{th}$ code. The weighted composite chip sequences are $$\vec{t}_1 = \sum_{k=1}^{K} w_1^{(k)} s_k \text{ and } \vec{t}_2 = \sum_{k=1}^{K} w_2^{(k)} s_k.$$

Equation (4) can be rewritten as follows:

$$r = H_1 \vec{t}_1 + H_2 \vec{t}_2 + n. \quad \text{Equation (5)}$$

The weighted composite chip sequences $\vec{t}_1$ and $\vec{t}_2$ can be demodulated using MMSE solution such that:

$$\hat{t} = (H^H H + \sigma^2 I)^{-1} H^H r. \qquad \text{Equation (6)}$$

The vector $\vec{t}$ is the estimated composite chip sequences and is expressed by $\vec{t} = [\vec{t}_1, \vec{t}_2]^T$.

In the presence of receive diversity and over-sampling, the channel response matrix H can be written as follows:

$$H = \begin{bmatrix} H_{1,o} \\ H_{1,e} \\ H_{2,o} \\ H_{2,e} \end{bmatrix}; \qquad \text{Equation (7)}$$

where $H_{i,o}$ and $H_{i,e}$ i=1, . . . N are the channel response matrix of the $i^{th}$ receiving antenna for odd and even sample sequences, respectively. Typically, N=2 for receive diversity and twice the chip rate sampling is used. However, N can be any number and the sampling rate can be any rate. For simplicity and illustration purposes, the present invention will be explained with reference to N=2 and twice the chip rate sampling hereinafter. In the presence of transmit adaptive antennas and receive diversity (N=2) with twice the chip rate over-sampling, the channel response matrix H can be written as follows:

$$H = \begin{bmatrix} H_{1,o}^{(1)} & H_{1,o}^{(2)} \\ H_{1,e}^{(1)} & H_{1,e}^{(2)} \\ H_{2,o}^{(1)} & H_{2,o}^{(2)} \\ H_{2,e}^{(1)} & H_{2,e}^{(2)} \end{bmatrix}; \qquad \text{Equation (8)}$$

where $H_{i,o}^{(j)}$ and $H_{i,e}^{(j)}$ are the channel response matrix of the $i^{th}$ receive antenna and the $j^{th}$ transmit antenna for odd and even sample sequences, respectively.

The estimated data symbols $\vec{d}_1$ and $\vec{d}_2$ can be simply obtained by multiplying the equalized composite chip sequences with complex conjugate of weights for both antennas, adding them up and despreading the added results as follows:

$$d_k = C_k^H (w_1^{(k)*} \vec{t}_1 + w_2^{(k)*} \vec{t}_2). \qquad \text{Equation (9)}$$

B-FFT is used to realize the joint processing. $H_{i,o}$ represents the channel response matrix for the $i^{th}$ receive antenna and odd sample sequences and for both transmit antenna. $H_{i,o}$ can be expressed as follows:

$$H_{i,o} = [H_{i,o}^{(1)} \; H_{i,o}^{(2)}]. \qquad \text{Equation (10)}$$

The channel response matrix $H_{i,o}$ can be further expressed in details in terms of channel coefficients as follows:

$$H_{1,o} = \begin{bmatrix} h_{1,0} & h_{2,0} & & & & & & \\ h_{1,1} & h_{2,1} & h_{1,0} & h_{2,0} & & & & \\ \vdots & \vdots & h_{1,1} & h_{2,1} & & & & \\ \vdots & \vdots & \vdots & \vdots & & & & \\ h_{1,W-2} & h_{2,W-2} & \vdots & \vdots & \ddots & & & \\ h_{1,W-1} & h_{2,W-1} & h_{1,W-2} & h_{1,W-2} & \ddots & & & \\ & & h_{1,W-1} & h_{1,W-1} & \ddots & & & \\ \vdots & \vdots & & & & & & \\ \vdots & \vdots & & & & h_{1,0} & h_{2,0} \\ & & & & \ddots & h_{1,1} & h_{2,1} \\ & & & & \ddots & \vdots & \vdots \\ & & & & \ddots & \vdots & \vdots \\ \vdots & \vdots & & & & h_{1,W-2} & h_{2,W-2} \\ & & & & & h_{1,W-1} & h_{2,W-1} \end{bmatrix}. \qquad \text{Equation (11)}$$

$H_{1,o}$ is expressed by the channel coefficients with pre-ordering of columns of channel matrix to transform the original matrix into a block circular matrix for channel response matrix H and to enable efficient B-FFT computations. Similarly, $H_{2,o}$, $H_{1,e}$ and $H_{2,e}$ can be expressed in the same form that enables the B-FFT.

Each block is defined as follows: $H_i = [h_{1,i} \; h_{2,i}]$, i=0,1, 2, . . . ,W−1. $H_{1,o}$ can then be expressed as follows:

$$H_{1,o} = \begin{bmatrix} H_0 & & & & \\ H_1 & H_0 & & & \\ \vdots & H_1 & & & \\ H_{W-1} & \vdots & & & \\ & H_{W-1} & & & \\ & & \ddots & & \\ & & & H_0 & \\ & & & H_1 & \\ & & & \vdots & \\ & & & H_{W-1} & \end{bmatrix}; \qquad \text{Equation (12)}$$

Where each $H_i$ is a matrix of size one by two.

$F_{(P)}$ and $F_{(K)}$ are B-FFT matrices of size P×P and K×K, respectively. The matrix $H_{1,o}$ can be decomposed by B-FFT in an extended manner as follows:

$$H_{1,o} = F_{(P)}^{-1} \Lambda_H F_{(K)}; \qquad \text{Equation (13)}$$

where $$F_{(P)} = F_L \otimes I_P; \quad \text{Equation (14)}$$

and $$F_{(K)} = F_L \otimes I_K; \quad \text{Equation (15)}$$

where $F_L$ is the L-point FFT matrix, $I_P$ and $I_K$ are the identity matrix of size P and K, respectively, and $\otimes$ is a kronecker product. For example, L=256 or 512, P=1 and K=2. It should be noted that the foregoing numbers are provided as an example and any other numbers may be implemented. L is scalable for more efficient implementation. $\Lambda_H$ is a block-diagonal matrix whose diagonal blocks are $F_{(K)}H(:,1:K)$.

$$\Lambda_H = \text{diag}(F_{(K)}H(:,1:K)). \quad \text{Equation (16)}$$

Also $$H_{1,o}{}^H = F_{(K)}{}^{-1}\Lambda^*_H F_{(P)}; \quad \text{Equation (17)}$$

$$H_{1,o}{}^H H_{1,o} = F_{(K)}{}^{-1}\Lambda^*_H \Lambda_H F_{(K)}; \quad \text{Equation (18)}$$

and $$H_{1,o}{}^H \vec{r}_{1,o} = F_{(K)}{}^{-1}\Lambda^*_H F_{(P)} \vec{r}_{1,o}. \quad \text{Equation (19)}$$

The transmitted data sequence s can be solved by the following quations:

$$y = \Lambda_H{}^H F_{(P)} r; \quad \text{Equation (20)}$$

$$y = \kappa_H{}^H \kappa_H x; \text{ and} \quad \text{Equation (21)}$$

$$t = F_{(K)}{}^{-1} x. \quad \text{Equation (22)}$$

In general, x can be solved block by block using Cholesky decomposition. Since the block size is very small (only 2×2 here in consideration, a direct matrix inverse of each block can be performed without using Cholesky decomposition. A similar approach can also be developed using time domain channel correlation matrix $R = H^H H$.

The correlation matrix R can be decomposed by B-FFT as follows:

$$R = F_{(P)}{}^{-1}\Lambda_H F_{(K)}; \quad \text{Equation (23)}$$

where $\Lambda_R$ is a block-diagonal matrix whose diagonal blocks are $F_{(K)}R(:,1:K)$ The above procedure is performed for $H_{1,o}$, $H_{2,o}$, $H_{1,e}$ and $H_{2,e}$ to develop the entire solution of joint processing and B-FFT is used to realize the joint processing for transmit adaptive antenna and receive diversity.

The detected data symbols of two transmit data sequences using joint processing are as follows:

$$\vec{t} = \left[\sum_{i=1}^N (H_{i,o}^H H_{i,o} + H_{i,e}^H H_{i,e}) + \sigma^2 I\right]^{-1} \cdot \left[\sum_{i=1}^N H_{i,o}^H \vec{r}_{i,o} + H_{i,e}^H \vec{r}_{i,e}\right]. \quad \text{Equation (24)}$$

The realization of joint processing using B-FFT are as follows:

$$\vec{t} = F_{(K)}^{-1}\left[\sum_{i=1}^N (\Lambda_{i,o}^* \Lambda_{i,o} + \Lambda_{i,e}^* \Lambda_{i,e}) + \sigma^2 I\right]^{-1} \cdot \quad \text{Equation (25)}$$

$$\left[\sum_{i=1}^N \Lambda_{i,o}^* F_{(P)} \vec{r}_{i,o} + \Lambda_{i,e}^* F_{(P)} \vec{r}_{i,e}\right].$$

By letting T and $\vec{y}$ represent as follows:

$$T = \sum_{i=1}^N (\Lambda_{i,o}^* \Lambda_{i,o} + \Lambda_{i,e}^* \Lambda_{i,e}) + \sigma^2 I; \quad \text{Equation (26)}$$

and, $$\vec{y} = \sum_{i=1}^N \Lambda_{i,o}^* F_{(P)} \vec{r}_{i,o} + \Lambda_{i,e}^* F_{(P)} \vec{r}_{i,e}; \quad \text{Equation (27)}$$

Equation (25) can be rewritten as follows:

$$T \cdot F_{(K)} \vec{t} = \vec{y}. \quad \text{Equation (28)}$$

$\vec{x} = F_{(K)} \vec{t}$ by Equation (22). Therefore, Equation (27) can be rewritten as follows:

$$T \vec{x} = \vec{y}. \quad \text{Equation (29)}$$

The unknown $\vec{x}$ is solved first. Once $\vec{x}$ are solved, inverse FFT is performed on $\vec{x}$ to obtain the composite chip sequences to be estimated as follows:

$$\vec{t} = F_{(K)}^{-1} \vec{x}. \quad \text{Equation (30)}$$

$F_{(K)}^{-1}$ is exchangeable with $F_{(K)}$ as follows:

$$F_{(k)}^{-1} = \frac{1}{L} F_{(K)}^*. \quad \text{Equation (31)}$$

FIGS. 2A and 2B, taken together, are an exemplary block diagram of a receiver 200 implementing B-FFT-based CLE using joint processing with transmit and receive diversity with two transmit antennas and two receive antennas at twice the chip rate in accordance with the present invention. As explained hereinbefore, any number of transmit and receive antennas and any sampling rate may be used. In this example, for a received signal r, four sample streams 202$_1$-202$_4$ are generated from two receive antennas (not shown). From the sample streams 202$_1$-202$_4$, channel responses between a first transmit antenna and two receive antennas for even and odd sample sequences $\vec{h}^{(1)}$ 206$_1$-206$_4$ and channel responses between a second transmit antenna and two receive antennas for even and odd sample sequences $\vec{h}^{(2)}$ 206$_5$-206$_8$ are generated by a channel estimator (not shown).

The sample streams 202$_1$-202$_4$ are processed by FFT units 204$_1$-204$_4$ to be converted into frequency domain data, respectively. The channel response vectors 206$_1$-206$_8$ are processed by FFT units 208$_1$-208$_8$, respectively to generate frequency domain channel response vectors 210$_1$-210$_8$. Complex conjugates 214$_1$-214$_8$ of the frequency domain channel response vectors 210$_1$-210$_8$ are generated by complex conjugate units 212$_1$-212$_8$, respectively. The frequency domain sample streams 216$_1$-216$_4$ and complex conjugates 214$_1$-214$_8$ of the frequency domain channel response vectors 210$_1$-210$_8$ are multiplied by element-wise multipliers 218$_1$-218$_8$, respectively. The multiplication results for the first transmit antenna $220_1$-$220_4$ are combined by a combiner $222_1$ and the multiplication results for the second transmit antenna $220_5$-$220_8$ are combined by a combiner $222_2$. The combined results $y^{(1)}$, $y^{(2)}$, ($224_1$, $224_2$), correspond to the output of Equation (20) (or Equation (27)).

The frequency domain channel response vectors $210_1$-$210_8$ and a noise variance value 232 enter a joint channel correlation generator 230. Equation (18) depicts the function of generator 230 for channel correlation generation that occurs in frequency domain. The function of processor 240 is depicted by Equations (18), (20), (21) and (22) for solving the linear systems. The joint channel correlation generator 230 generates joint channel correlation matrix $234_1$-$234_4$ between two transmit antennas and two receive antennas and even and odd sample stream. The joint channel correlation matrixes $234_1$-$234_4$ are combined by a combiner 236 and the combined joint channel correlation matrix 238, which corresponds to T in Equation (26), enters a processor 240.

The processor 240 receives as an input the combined joint channel correlation matrix 238 and two combined results $y^{(1)}$, $y^{(2)}$ $224_1$, $224_2$ and generates estimates of the transmitted chip sequences by solving the 2×2 linear systems of Equation (29). The estimates of the transmitted chip sequences $242_1$, $242_2$ undergo transmit adaptive antenna processing by being multiplied with complex conjugates $248_1$, $248_2$ of weight factors $244_1$, $244_2$ generated by complex conjugate units $246_1$, $246_2$, by element-wise multipliers $218_9$ and $218_{10}$, respectively. The two multiplier outputs $250_1$, $250_2$ are soft combined by a summer 252 and the combined output 254 is processed by an IFFT unit 256 to be converted into time domain signals 258. Then, the time domain signals 258 are processed by a despreader 260 to generate a data symbol estimate 262.

Figure 3:
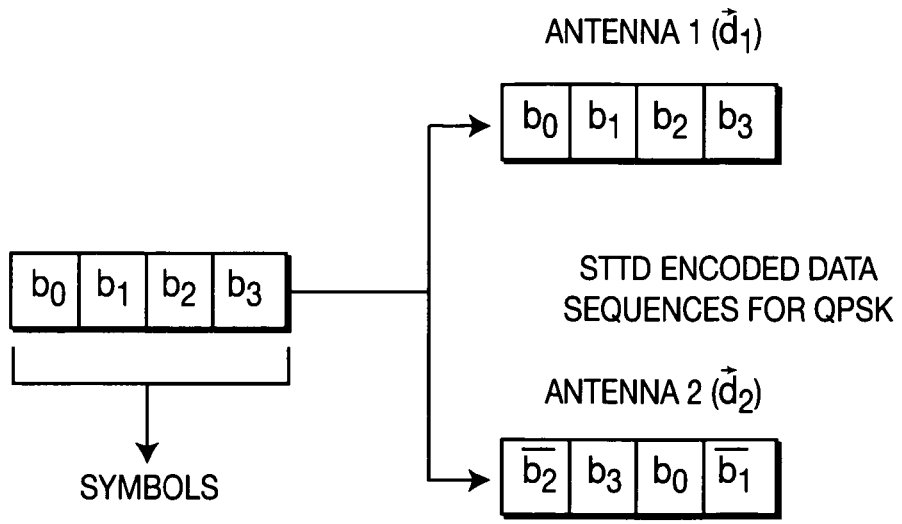
FIG. 3 shows a space time transmit diversity (STTD) encoder for quadrature phase shift keying (QPSK)
Figure 4:
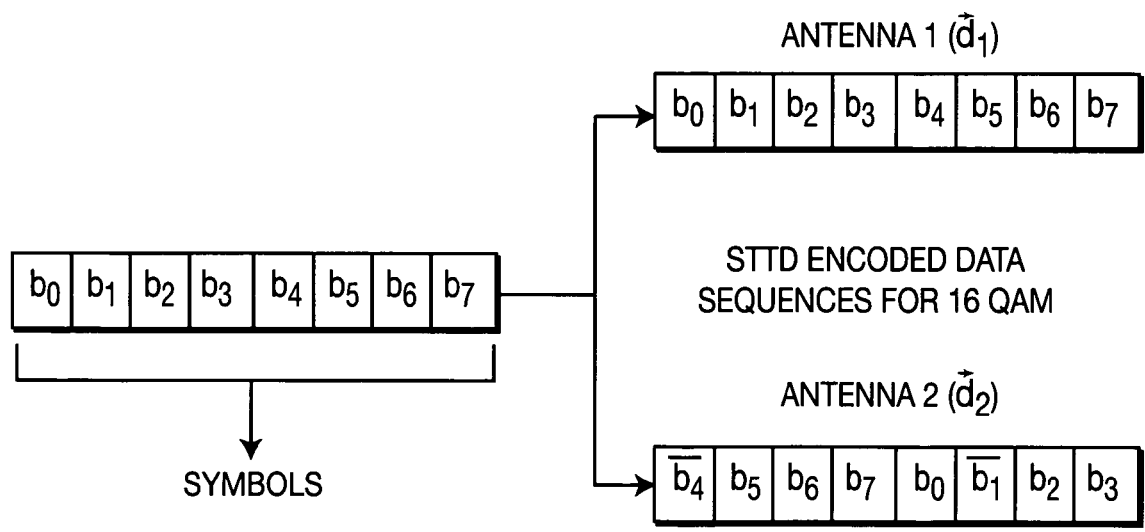
FIG. 4 shows an STTD encoder for 16 quadrature amplitude modulation (16 QAM)

The present invention may be implemented with STTD. For STTD, a first antenna transmits $\vec{d}_1$ and a second antenna transmits $\vec{d}_2$, where $\vec{d}_1$ and $\vec{d}_2$ are STTD encoded data sequences. FIG. 3 shows the STTD encoded data sequences for QPSK, such that $\vec{d}_1=[b_0\ b_1\ b_2\ b_3]^T$ and $\vec{d}_2=[\bar{b}_2\ b_3\ b_0\ \bar{b}_1]^T$. FIG. 4 shows the STTD encoded data sequences for 16 QAM such that $\vec{d}_1=[b_0\ b_1\ b_2\ b_3\ b_4\ b_5\ b_6\ b_7]^T$ and $\vec{d}_2=[\bar{b}_4\ b_5\ b_6\ b_7\ b_0\ \bar{b}_1\ b_2\ b_3]^T$.

The received signal at the receiver can be expressed as follows:

$$r=H_1 s_1+H_2 s_2+n; \quad \text{Equation (32)}$$

where $H_1$ and $H_2$ is the channel response matrix corresponding to the first and second diversity antennas, respectively. The chip and STTD encoded symbol sequences are related by the spreading code matrix C as $s_1=C\vec{d}_1$ and $s_2=C\vec{d}_2$.

The chip sequences $s_1$ and $s_2$ can be demodulated at the receiver using MMSE such that:

$$\hat{s}=(H^H H+\sigma^2 I)^{-1} H^H r. \quad \text{Equation (33)}$$

In the presence of receive diversity and over-sampling, the channel response matrix H can be expressed by Equation (7) and in the presence of STTD transmit diversity and receive diversity (N=2) with twice the chip rate over-sampling, the channel response matrix H can be expressed by Equation (8).

The STTD encoded data symbols $\vec{d}_1$ and $\vec{d}_2$ can be simply obtained by de-spreading the equalized chip sequences. Because data sequences $b_i$, i=0,1,2, . . . ,7 are detected in both STTD encoded data vectors $\vec{d}_1$ and $\vec{d}_2$, the STTD decoding and soft combining are used to achieve diversity gain and improve performance such as:

$$d=\alpha_1\cdot\text{sign}(b_{i,ant1})+\alpha_2\cdot\text{sign}(b_{i,ant2}); \quad \text{Equation (34)}$$

where the notation sign ( ) represents the sign changes according to STTD decoding rules and modulation types, such as QPSK and 16 QAM.

For QPSK, the STTD decoding are described as follows:
Antenna 1:

$$\text{sign}(b_{i,ant1})=b_{i,ant1}, \text{ for all } i$$

Antenna 2:

$$\text{sign}(b_{i,ant2})=b_{i,ant2}, \text{ if } i=0,3$$

$$\text{sign}(b_{i,ant2})=-b_{i,ant2}, \text{ else (or } i=1,2)$$

For 16 QAM, the STTD decoding are as follows:
Antenna 1:

$$\text{sign}(b_{i,ant1})=b_{i,ant1}, \text{ for all } i$$

Antenna 2:

$$\text{sign}(b_{i,ant1})=b_{i,ant2}, \text{ if } i=0,2,3,5,6,7$$

$$\text{sign}(b_{i,ant2})=-b_{i,ant2}, \text{ else (or } i=1,4)$$

For equal gain soft combining, the weight coefficients are $\alpha_1=\alpha_2=1$. For maximal ratio combining (MRC), the weight coefficients $\alpha_n$, n=1,2 are preferably as follows:

$$\alpha_n=\sqrt{\frac{\sum_i |h_{n,i}|^2}{\sum_i |h_{1,i}|^2+\sum_i |h_{2,i}|^2}}, n=1,2. \quad \text{Equation (35)}$$

B-FFT is used to realize the joint processing. For example, $H_{i,o}$ representing the channel response matrix for the $i^{th}$ receive antenna and odd sampled sequences and for both transmit antenna can be expressed as follows:

$$H_{i,o}=[H_{i,o}^{(1)}\ H_{i,o}^{(2)}]. \quad \text{Equation (36)}$$

The channel response matrix $H_{i,o}$ can be expressed in details by Equation (11) in terms of channel coefficients and can also be expressed by Equation (12). The matrix $H_{i,o}$ can be decomposed by B-FFT by Equations (13)-(15).

The transmitted data sequence s can be estimated by the following equations:

$$y=F_{(P)}r; \quad \text{Equation (37)}$$

$$\Lambda_H^H y=\Lambda_H^H \Lambda_H x; \quad \text{Equation (38)}$$

$$s=F_{(K)}^{-1} x. \quad \text{Equation (39)}$$

In general, the x can be solved block by block using Cholesky decomposition. Since the block size is very small (only 2×2) for the example under consideration, a solution using a direct matrix inverse of each block can be performed without using Cholesky decomposition. A similar approach can also be developed using a time domain channel correlation matrix $R=H^H H$. Same procedure is repeated for $H_{1,o}$, $H_{2,o}$, $H_{1,e}$ and $H_{2,e}$ to develop the entire solution of joint processing and B-FFT is used to realize the joint processing for STTD and receive diversity.

The detected data symbols of two transmit data sequences using joint processing are expressed as follows:

$$\vec{d}_{Tx} = \left[\sum_{i=1}^{N}(H_{i,o}^H H_{i,o} + H_{i,e}^H H_{i,e}) + \sigma^2 I\right]^{-1} \cdot \quad \text{Equation (40)}$$

$$\left[\sum_{i=1}^{N} H_{i,o}^H \vec{r}_{i,o} + H_{i,e}^H \vec{r}_{i,e}\right].$$

The realization of joint processing using B-FFT are as follows:

$$\vec{d}_{Tx} = F_{(K)}^{-1}\left[\sum_{i=1}^{N}(\Lambda_{i,o}^* \Lambda_{i,o} + \Lambda_{i,e}^* \Lambda_{i,e}) + \sigma^2 I\right]^{-1} \cdot \quad \text{Equation (41)}$$

$$\left[\sum_{i=1}^{N} \Lambda_{i,o}^* F_{(P)} \vec{r}_{i,o} + \Lambda_{i,e}^* F_{(P)} \vec{r}_{i,e}\right].$$

By letting $R_{\mathit{fft}}$ and $\vec{y}$ represent as follows:

$$R_{\mathit{fft}} = \sum_{i=1}^{N}(\Lambda_{i,o}^* \Lambda_{i,o} + \Lambda_{i,e}^* \Lambda_{i,e}) + \sigma^2 I; \quad \text{Equation (42)}$$

and $$\vec{y} = \sum_{i=1}^{N} \Lambda_{i,o}^* F_{(P)} \vec{r}_{i,o} + \Lambda_{i,e}^* F_{(P)} \vec{r}_{i,e}, \quad \text{Equation (43)}$$

the Equation (41) can be rewritten as follows:

$$R_{\mathit{fft}} F_{(K)} \vec{d}_{Tx} = \vec{y}. \quad \text{Equation (44)}$$

Furthermore, by letting $\vec{x} = F_{(K)} \vec{d}_{Tx}$, a linear system is obtained such that:

$$R_{\mathit{fft}} \vec{x} = \vec{y}. \quad \text{Equation (45)}$$

After solving the unknown $\vec{x}$, an inverse FFT is performed on $\vec{x}$ to obtained the data symbols to be estimated as follows:

$$\vec{d}_{Tx} = F_{(K)}^{-1} \vec{x}. \quad \text{Equation (46)}$$

$F_{(K)}^{-1}$ is exchangeable with $F_{(K)}$ as follows:

$$F_{(K)}^{-1} = \frac{1}{L} F_{(K)}^*. \quad \text{Equation (47)}$$

Figure 5B:
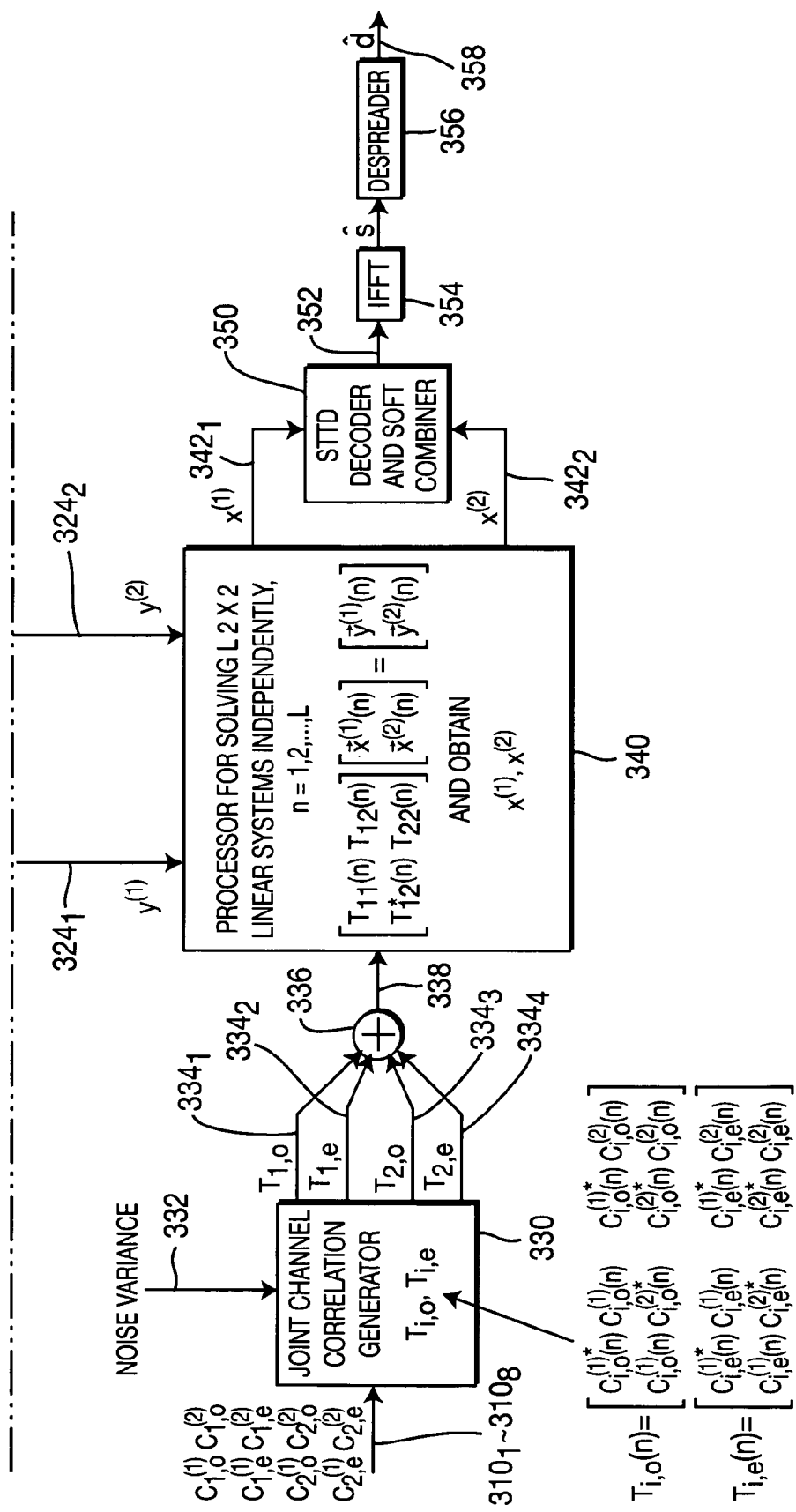

FIGS. 5A and 5B, taken together, are a block diagram of a receiver 300 implementing B-FFT-based CLE using joint processing in STTD and receive diversity with over sampling in accordance with the present invention. As explained hereinbefore, any number of transmit and receive antennas and any sampling rate may be used. In this example, for a received signal r, four sample streams $302_1$-$302_4$ are generated from two receive antennas (not shown). From the sample streams $302_1$-$302_4$, channel responses between a first transmit antenna and two receive antennas for even and odd sample sequences $\vec{h}^{(1)}$ $306_1$-$306_4$ and channel responses between a second transmit antenna and two receive antennas for even and odd sample sequences $\vec{h}^{(2)}$ $306_5$-$306_8$ are generated by a channel estimator (not shown).

The sample streams $302_1$-$302_4$ are processed by FFT units $304_1$-$304_4$ to be converted into frequency domain data, respectively. The channel response vectors $306_1$-$306_8$ are processed by FFT units $308_1$-$308_8$, respectively to generate frequency domain channel response vectors $310_1$-$310_8$. Complex conjugates $314_1$-$314_8$ of the frequency domain channel response vectors $310_1$-$310_8$ are generated by complex conjugate units $312_1$-$312_8$, respectively. The frequency domain sample streams $316_1$-$316_4$ and complex conjugates $314_1$-$314_8$ of the frequency domain channel response vectors $310_1$-$310_8$ are multiplied by element-wise multipliers $318_1$-$318_8$, respectively. The multiplication results for the first transmit antenna $320_1$-$320_4$ are combined by a combiner $322_1$ and the multiplication results for the second transmit antenna $320_5$-$320_8$ are combined by a combiner $322_2$. The combined results $y^{(1)}$, $y^{(2)}$, ($324_1$, $324_2$), which correspond to the output of Equation (48).

The frequency domain channel response vectors $310_1$-$310_8$ and a noise variance value 332 enter a joint channel correlation generator 330. Equation (18) depicts the function of generator 330. Equations (38), (39) and (40) depict the function of processor 340. The joint channel correlation generator 330 generates joint channel correlation matrix $334_1$-$334_4$ between two transmit antennas and two receive antennas for even and odd sample streams. The joint channel correlation matrixes $334_1$-$334_4$ are combined by a combiner 336 and the combined joint channel correlation matrix 338, which corresponds to $R_{\mathit{fft}}$ in Equation (42), enters a processor 340.

The processor 340 receives as an input the combined joint channel correlation matrix 338 and two combined results $y^{(1)}$, $y^{(2)}$, $324_1$, $324_2$ and generates estimates of the transmitted chip sequences by solving the 2×2 linear systems of Equation (45). The equalized chip sequences $342_1$, $342_2$ are STTD decoded and soft combined by a STTD decoder/soft combiner 350 as shown in Equation (34). The STTD decoded and combined chip sequences 352 is processed by an IFFT unit 354 and despreader 356 to generate an estimate of transmitted data 358.

Although the features and elements of the present invention are described in the preferred embodiments in particular combinations, each feature or element can be used alone without the other features and elements of the preferred embodiments or in various combinations with or without other features and elements of the present invention.

What is claimed is:

1. In a wireless communication system including a transmitter having a plurality of antennas for transmission and a receiver having a plurality of antennas for reception, a method of performing chip level equalization (CLE) using joint processing of received signals, the method comprising:
   generating a sample sequence from received signals;
   generating a channel response matrix between the plurality of transmit antennas and the plurality of receive antennas from the sample sequence;
   generating a joint channel correlation matrix between the transmit antennas and the receive antennas using a block fast Fourier transform (B-FFT) decomposition of the channel response matrix;
   generating estimates of transmitted chip sequences from each transmit antenna using minimum mean square error (MMSE) and the joint channel correlation matrix;
   combining the estimates of transmitted chip sequences from the transmit antennas; and
   despreading the combined estimate of transmitted chip sequences.

2. The method of claim 1 wherein a closed loop mode transmit diversity is implemented.

3. The method of claim 2 further comprising:
multiplying complex conjugate of a weight to the estimates of transmitted chip sequences, the weight being applied to a transmitted chip sequence at a transmitter for the closed loop mode transmit diversity.

4. The method of claim 3 wherein the closed loop mode transmit diversity is either mode 1 or mode 2.

5. The method of claim 1 wherein a space time transmit diversity (STTD) is implemented in transmission.

6. The method of claim 5 further comprising a step of an STTD decoding of the estimates of transmitted chip sequences.

7. The method of claim 1 wherein the estimates of the transmitted chip sequence is performed by using Cholesky decomposition block by block.

8. The method of claim 1 wherein the estimates of the transmitted chip sequence is performed by direct matrix inversion.

9. The method of claim 1 wherein the received signals are over-sampled.

10. The method of claim 9 wherein the received signals are over-sampled at twice the chip rate.

11. In a wireless communication system including a transmitter having a plurality of antennas for transmission and a receiver having a plurality of antennas for reception, an apparatus for performing chip level equalization (CLE) using joint processing of received signals, the apparatus comprising:
a sampling unit for generating a sample sequence from received signals;
a channel estimator for generating a channel response matrix between the plurality of transmit antennas and the plurality of receive antennas from the sample sequence;
a joint channel correlation generator for generating a joint channel correlation matrix between the transmit antennas and the receive antennas using a block fast Fourier transform (B-FFT);
a processing unit for generating estimates of transmitted chip sequences from each transmit antenna using minimum mean square error (MMSE) and a B-FFT based on the joint channel correlation matrix;
a soft combiner for combining the estimates of transmitted chip sequences from each transmit antenna;
an inverse fast Fourier transform (IFFT) unit for performing IFFT on a combined estimates from the combiner; and
a despreader for despreading an output of the IFFT unit.

12. The apparatus of claim 11 wherein the processing unit comprising:
a plurality of fast Fourier transform (FFT) units for performing FFT on the samples;
a plurality of FFT units for performing FFT on channel impulse responses between each transmit antenna and each receive antenna;
a plurality of complex conjugate generators for generating complex conjugate of the FFT on channel impulse responses;
a plurality of multipliers for multiplying the FFT on the samples and the complex conjugate of the FFT on channel impulse responses;
a plurality of combiners for combining the multiplication results corresponding each of the transmit antennas; and
a processor for generating estimates of transmitted chip sequences from each transmit antenna from the results of the combiners and the joint channel correlation matrix.

13. The apparatus of claim 11 wherein closed loop mode transmit diversity is implemented.

14. The apparatus of claim 13 further comprising:
a plurality of complex conjugate generators for generating complex conjugates of weights applied to the transmit antennas for the closed loop mode transmit diversity; and
a plurality of multipliers for multiplying a complex conjugate of a weight to the estimates of transmitted chip sequence corresponding each transmit antenna, respectively.

15. The apparatus of claim 13 wherein the closed loop mode transmit diversity is either mode 1 or mode 2.

16. The apparatus of claim 11 wherein a space time transmit diversity (STTD) is implemented in transmission.

17. The apparatus of claim 16 further comprising an STTD decoder for performing STTD decoding of the estimates of transmitted chip sequences.

18. The apparatus of claim 11 wherein the estimates of the transmitted chip sequence is performed by using Cholesky decomposition block by block.

19. The apparatus of claim 11 wherein the estimates of the transmitted chip sequence is performed by direct matrix inversion.

20. The apparatus of claim 11 wherein the received signals are over-sampled.

21. The apparatus of claim 20 wherein the received signals are over-sampled at twice the chip rate.

22. In a wireless communication system including a transmitter having a plurality of antennas for transmission and a receiver having a plurality of antennas for reception, an integrated circuit (IC) for performing chip level equalization (CLE) using joint processing of received signals, the IC comprising:
a sampling unit for generating a sample sequence from received signals;
a channel estimator for generating a channel response matrix between the plurality of transmit antennas and the plurality of receive antennas from the sample sequence;
a joint channel correlation generator for generating a joint channel correlation matrix between the transmit antennas and the receive antennas using a block fast Fourier transform (B-FFT);
a processing unit for generating estimates of transmitted chip sequences from each transmit antenna using minimum mean square error (MMSE) and a B-FFT based on the joint channel correlation matrix;
a soft combiner for combining the estimates of transmitted chip sequences from each transmit antenna;
an inverse fast Fourier transform (IFFT) unit for performing IFFT on a combined estimates from the combiner; and
a despreader for despreading an output of the IFFT unit.

23. The IC of claim 22 wherein the processing unit comprising:
a plurality of fast Fourier transform (FFT) units for performing FFT on the samples;
a plurality of FFT units for performing FFT on channel impulse responses between each transmit antenna and each receive antenna;
a plurality of complex conjugate generators for generating complex conjugate of the FFT on channel impulse responses;
a plurality of multipliers for multiplying the FFT on the samples and the complex conjugate of the FFT on channel impulse responses;

a plurality of combiners for combining the multiplication results corresponding each of the transmit antennas; and a processor for generating estimates of transmitted chip sequences from each transmit antenna from the results of the combiners and the joint channel correlation matrix.

24. The IC of claim 22 wherein closed loop mode transmit diversity is implemented.

25. The IC of claim 24 further comprising:

a plurality of complex conjugate generators for generating complex conjugates of weights applied to the transmit antennas for the closed loop mode transmit diversity; and a plurality of multipliers for multiplying a complex conjugate of a weight to the estimates of transmitted chip sequence corresponding each transmit antenna, respectively.

26. The IC of claim 24 wherein the closed loop mode transmit diversity is either mode 1 or mode 2.

27. The IC of claim 22 wherein a space time transmit diversity (STTD) is implemented in transmission.

28. The IC of claim 27 further comprising an STTD decoder for performing STTD decoding of the estimates of transmitted chip sequences.

29. The IC of claim 22 wherein the estimates of the transmitted chip sequence is performed by using Cholesky decomposition block by block.

30. The IC of claim 22 wherein the estimates of the transmitted chip sequence is performed by direct matrix inversion.

31. The IC of claim 22 wherein the received signals are over-sampled.

32. The IC of claim 31 wherein the received signals are over-sampled at twice the chip rate.

* * * * *

UNITED STATES PATENT AND TRADEMARK OFFICE
CERTIFICATE OF CORRECTION

PATENT NO. : 7,539,262 B2
APPLICATION NO. : 11/259430
DATED : May 26, 2009
INVENTOR(S) : Pan et al.

It is certified that error appears in the above-identified patent and that said Letters Patent is hereby corrected as shown below:

IN THE SPECIFICATION

At column 4, delete Equation (4), and insert therefor
--
$$\underline{r} = H_1 \left( \sum_{k=1}^{K} w_1^{(k)} \underline{s}_k \right) + H_2 \left( \sum_{k=1}^{K} w_2^{(k)} \underline{s}_k \right) + \underline{n};$$
--.

At column 4, line 42, before the words "the channel" delete "is" and insert therefor --are--.

At column 4, line 46, after "C as" delete "$s_k$" and insert therefor --$\underline{s}_k$--.

At column 4, delete Equation (5) and insert therefor
--
$$\underline{r} = H_1 \vec{t}_1 + H_2 \vec{t}_2 + \underline{n}.$$
--.

At column 5, delete Equation (6) and insert therefor
--
$$\hat{\underline{t}} = (H^H H + \sigma^2 I)^{-1} H^H \underline{r}.$$
--.

At column 6, line 45, after "$H_i = [h_{1,i}\ h_{2,i}]$," delete "i==0,1," and insert therefor --i = 0,1,--.

At column 7, line 26, after the word "sequence" delete "s" and insert therefor --$\underline{s}$--.

At column 7, line 27, after "lowing" delete "quations:" and insert therefor --Equations:--.

At column 7, delete Equations (20), (21), & (22) and insert therefor
--
$$\underline{y} = \Lambda_H{}^H F_{(P)}\ \underline{r};$$
$$\underline{y} = \Lambda_H{}^H \Lambda_H\ \underline{x}\ ;\ \text{and}$$
$$\underline{t} = F_{(K)}{}^{-1}\ \underline{x}.$$
--.

UNITED STATES PATENT AND TRADEMARK OFFICE
CERTIFICATE OF CORRECTION

| | |
|---|---|
| PATENT NO. | : 7,539,262 B2 |
| APPLICATION NO. | : 11/259430 |
| DATED | : May 26, 2009 |
| INVENTOR(S) | : Pan et al. |

It is certified that error appears in the above-identified patent and that said Letters Patent is hereby corrected as shown below:

At column 9, delete Equation (32) and insert therefor --$\underline{r} = H_1\underline{s}_1 + H_2\underline{s}_2 = \underline{n}$;--.

At column 9, line 49, before the words "the channel" delete "is" and insert therefor --are--.

At column 9, line 52, after "C as" delete "$s_1$" and insert therefor --$\underline{s}_1$--.

At column 9, line 52, after the word "and" delete "$s_2$" and insert therefor --$\underline{s}_2$--.

At column 9, line 54, after the word "sequences" delete "$s_1$ and $s_2$" and insert therefor --$\underline{s}_1$ and $\underline{s}_2$--.

At column 9, delete Equation (33) and insert therefor
--
$$\hat{\underline{s}} = (H^H H + \sigma^2 I)^{-1} H^H \underline{r}.$$
--.

At column 10, delete line 24 and insert therefor --$\text{sign}(b_{i,ant2}) = b_{i,ant2}$, if i=0,2,3,5,6,7--.

At column 10, delete Equation (35) and insert therefor
--
$$\alpha_n = \sqrt{\frac{\sum_i |h_{n,i}|^2}{\sum_i |h_{1,i}|^2 + \sum_i |h_{2,i}|^2}}, \; n = 1,2.$$
--.

At column 10, line 46, after the word "matrix" delete "$H_{i,o}$" and insert therefor --$H_{1,o}$--.

At column 10, line 48, after the word "sequence" delete "s" and insert therefor --$\underline{s}$--.

UNITED STATES PATENT AND TRADEMARK OFFICE
CERTIFICATE OF CORRECTION

PATENT NO. : 7,539,262 B2
APPLICATION NO. : 11/259430
DATED : May 26, 2009
INVENTOR(S) : Pan et al.

It is certified that error appears in the above-identified patent and that said Letters Patent is hereby corrected as shown below:

At column 10, delete Equations (37), (38), & (39) and insert therefor

--
$$\underline{y} = F_{(P)}\underline{x};$$
$$\Lambda_H{}^H \underline{y} = \Lambda_H{}^H \Lambda_H \underline{x};$$
$$\underline{s} = F_{(K)}^{-1} \underline{x}.$$
--.

At column 12, line 36, before the word "processed" delete "is" and insert therefor --are--.

IN THE CLAIMS

At claim 11, column 13, line 46, before the words "from the" delete "estimates" and insert therefor --estimate--.

At claim 12, column 13, line 63, before the words "each of" insert --to--.

At claim 14, column 14, line 10, before the word "each" insert --to--.

At claim 23, column 15, line 2, before the words "each of" insert --to--.

At claim 25, column 15, line 17, before the word "each" insert --to--.

Signed and Sealed this

First Day of September, 2009

David J. Kappos
*Director of the United States Patent and Trademark Office*